United States Patent
Messinger

(10) Patent No.: US 7,895,153 B2
(45) Date of Patent: Feb. 22, 2011

(54) SYSTEM AND METHOD FOR PERFORMING COMMUTATIVE OPERATIONS IN DATA ACCESS SYSTEMS

(75) Inventor: Adam Messinger, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 401 days.

(21) Appl. No.: 11/952,834

(22) Filed: Dec. 7, 2007

(65) Prior Publication Data

US 2008/0091683 A1 Apr. 17, 2008

Related U.S. Application Data

(63) Continuation of application No. 11/052,242, filed on Feb. 7, 2005, now Pat. No. 7,318,065, which is a continuation of application No. 10/262,255, filed on Oct. 1, 2002, now Pat. No. 6,898,587.

(60) Provisional application No. 60/382,668, filed on May 23, 2002.

(51) Int. Cl.
*G06F 7/00* (2006.01)
*G06F 17/00* (2006.01)
(52) U.S. Cl. ...................... 707/607; 707/758
(58) Field of Classification Search .................. 707/607
See application file for complete search history.

(56) References Cited

U.S. PATENT DOCUMENTS

| | | | |
|---|---|---|---|
| 4,714,996 A | 12/1987 | Gladney et al. | |
| 5,581,753 A * | 12/1996 | Terry et al. | 707/201 |
| 5,613,060 A | 3/1997 | Britton et al. | |
| 5,634,052 A | 5/1997 | Morris | |
| 5,765,171 A | 6/1998 | Gehani et al. | |
| 5,813,017 A | 9/1998 | Morris | |
| 5,909,689 A | 6/1999 | Van Ryzin | |
| 6,065,046 A | 5/2000 | Feinberg et al. | |
| 6,173,293 B1 | 1/2001 | Thekkath et al. | |
| 6,256,634 B1 | 7/2001 | Moshaiov et al. | |
| 6,304,879 B1 | 10/2001 | Sobeski et al. | |
| 6,366,930 B1 | 4/2002 | Parker et al. | |
| 6,401,239 B1 | 6/2002 | Miron | |
| 6,430,564 B1 | 8/2002 | Judge et al. | |
| 6,431,770 B1 | 8/2002 | Kurematsu et al. | |
| 6,453,321 B1 | 9/2002 | Hill et al. | |
| 6,526,521 B1 | 2/2003 | Lim | |

(Continued)

OTHER PUBLICATIONS

Bea Systems, Connecting Management (2001), 1-3 pages.

(Continued)

*Primary Examiner*—John R. Cottingham
*Assistant Examiner*—Nicholas E Allen
(74) *Attorney, Agent, or Firm*—Fliesler Meyer LLP

(57) ABSTRACT

An embodiment of the invention allows a software developer or administrator to use their knowledge and/or development of a particular application, to optimize the performance of data access and updates to the database. In order to do this, an embodiment of the invention makes use of the developers knowledge of particular transaction and transaction operations that can be performed in a commutative manner. The overall effect is to perform the operations in a parallel fashion so that one operation does not block or restrict the processing of a second operation. The result is an increase in database access or performance, without any resulting decrease in database reliability.

22 Claims, 7 Drawing Sheets

U.S. PATENT DOCUMENTS

| | | | |
|---|---|---|---|
| 6,567,809 B2 | 5/2003 | Santosuosso |
| 6,578,160 B1 | 6/2003 | MacHardy et al. |
| 6,609,213 B1 | 8/2003 | Nguyen et al. |
| 6,651,140 B1 | 11/2003 | Kumar |
| 6,675,261 B2 | 1/2004 | Shandony |
| 6,711,579 B2 | 3/2004 | Balakrishnan |
| 6,757,708 B1 | 6/2004 | Craig et al. |
| 6,826,601 B2 | 11/2004 | Jacobs et al. |
| 6,836,889 B1 | 12/2004 | Chan et al. |
| 6,898,587 B2 | 5/2005 | Messinger |
| 6,918,013 B2 | 7/2005 | Jacobs et al. |
| 7,000,019 B2 | 2/2006 | Low et al. |
| 7,028,030 B2 | 4/2006 | Jacobs et al. |
| 7,039,923 B2 | 5/2006 | Kumar et al. |
| 7,065,616 B2 | 6/2006 | Gajjar et al. |
| 7,085,834 B2 | 8/2006 | Delany et al. |
| 7,089,584 B1 | 8/2006 | Sharma |
| 7,107,543 B2 | 9/2006 | Berry et al. |
| 7,127,713 B2 | 10/2006 | Davis et al. |
| 7,171,692 B1 | 1/2007 | DeMello et al. |
| 7,188,145 B2 | 3/2007 | Lowery et al. |
| 7,213,049 B2 | 5/2007 | Felt et al. |
| 7,240,101 B2 | 7/2007 | Rich et al. |
| 7,254,634 B1 | 8/2007 | Davis et al. |
| 2001/0042073 A1 | 11/2001 | Saether |
| 2002/0004850 A1 | 1/2002 | Sudarshan et al. |
| 2002/0073188 A1 | 6/2002 | Rawson |
| 2002/0194244 A1* | 12/2002 | Raventos | 709/101 |
| 2003/0014480 A1 | 1/2003 | Pullara et al. |
| 2003/0041135 A1 | 2/2003 | Keyes et al. |
| 2003/0065826 A1 | 4/2003 | Skufca et al. |
| 2003/0074580 A1 | 4/2003 | Knouse et al. |
| 2003/0105837 A1 | 6/2003 | Kamen et al. |
| 2003/0115366 A1 | 6/2003 | Robinson |
| 2003/0233433 A1 | 12/2003 | Halpern |
| 2004/0230747 A1 | 11/2004 | Ims et al. |
| 2006/0143239 A1 | 6/2006 | Battat et al. |

OTHER PUBLICATIONS

Gamma et al., "Design Patterns Elements of Reusable Object-Oriented Software", Addison-Wesley Publishing Company, 1998, pp. 293-303.

DeMichiel,et al., "Enterprise JavaBeans Specification Version 2.0, Sun Microsystems", Aug. 14, 2001, 2 pages.

\* cited by examiner

SYSTEM AND METHOD FOR PERFORMING COMMUTATIVE OPERATIONS IN DATA ACCESS SYSTEMS

CLAIM OF PRIORITY

This application is a continuation of U.S. patent application Ser. No. 11/052,242, filed Feb. 7, 2005 (now allowed), entitled "System and Method for Commutative Operations in Data Access Systems," which is a continuation of U.S. patent application Ser. No. 10/262,255, filed Oct. 1, 2002 (now U.S. Pat. No. 6,898,587), entitled "System and Method for Commutative Operations in Data Access Systems," which claims priority under 35 U.S.C. 119(e) to Provisional Patent Application No. 60/382,668, filed May 23, 2002, entitled "System and Method for Commutative Operations in Data Access Systems". Each of the above applications is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

An embodiment of the invention is generally related to database systems, and to a system and method for performing and optimizing commutative date access operations.

CROSS REFERENCE TO RELATED APPLICATIONS

This application is related to United States Patent Application entitled "System and Method for Optimistic Caching", Ser. No. 10/340,023, filed Jan. 10, 2003 by Adam Messinger, et al. and which is incorporated herein in its entirety.

BACKGROUND OF THE INVENTION

Today's business environment places increasing emphasis on computer resources, and the storage and sharing of data. As more and more people become connected to the digital world, the requirements to share and use computer-accessible and stored data is ever more important. In the past, data storage systems were often the sole responsibility of large organizations, such as banks and financial institutions. Today's e-commerce environment however places greater emphasis on the distribution and easy access to data from anywhere in the world.

Data storage and access systems are of particular importance in the e-commerce or e-business world, particularly in such areas as Business-to-Commerce (B2C) and Business-to-Business (B2B) environments. The typical e-commerce application, such as a financial application or a web commerce application, uses and often depends on reliable and efficient access to large amounts of data. In this arena, the database or data repository is the preferred source of data storage. Database systems have been around for many years now, and their importance in the e-commerce environment is well known. Such databases include the Oracle database system from Oracle Systems, and the dB3 database system from IBM. A common feature of most modern database systems is that they allow access from a wide variety of clients and/or other servers, and using a wide variety of application software systems.

Database systems, while great at storing data, would be of little use if they did not provide a mechanism by which data could be easily and efficiently retrieved and/or updated. To this end, many application server providers provide application servers that can be used to allow access to the data on a typical database system. One such application server is the BEA WebLogic Server system from BEA Systems, Inc. San Jose, Calif. Application servers such as WebLogic Server allow software developers to build applications, that are then used to access and/or update data on the database, in accordance with a particular client applications needs. Application servers are of particular use in developing e-commerce applications for distribution or access over the web or Internet. In accordance with a typical scenario, the application server hosts a web server, which in turn supports many web applications. The multitude of clients on the Internet can access this web application to update and/or retrieve data from a database system in communication with the web server. A typical web application may have many hundreds, or thousands, of clients accessing it on a daily basis, and very busy web applications may have thousands of client applications accessing it at the same time. An important consideration when developing application servers and/or databases for providing data is to design them in such a way that this great number of clients can access the data in an efficient manner, without placing too much load on the server itself. Failure to take this into consideration can cause errors in the transaction itself, or delays in processing the transactions. Since in today's environment, a client application (and the user that operates that application) will quickly become frustrated if access to a particular data source is denied, even temporarily, such that and the user may even opt to switch to a different e-commerce provider, the importance of maintaining reliable and efficient connections between a client application and the database or data repository, cannot be underestimated.

The consideration of multiple client, and/or multiple transaction access to single or limited data resources, is of particular importance in on-line transaction processing (OLTP) systems. The term on-line transaction processing system commonly refers to those systems that are accessed in an on-line manner, i.e. over a network or communication link, such as the Internet, and that are used to handle and process transactions originating at a client application for processing at a server. Typically, as part of the transaction, data will be written to, or read from, a database or data repository, which in some instances is considered temporary storage, and in other instances will be a more permanent storage, particularly one in which customer records or data is stored. On-line transaction processing systems include financial applications such as stock trading, and banking applications. In these systems, the high volume of transactions, such as perhaps thousands of simultaneous stock trades, place emphasis on particular areas of the data, particularly when, for example, one or more stocks are hot or are in great demand that day.

When a portion of the database and/or data repository is effected by such high frequency transaction access, the data portion is commonly referred to as a "hot spot". Hot spots are particularly troublesome for database systems, including OLTP systems, because they create a bottleneck through which many transactions must pass in order to be completed. Although database systems are usually well designed today, such that the transaction will not be created in error, it is relatively common that a hot spot will cause transactions to back up to such an extent that they will fail or freeze, such that the user or client application will be forced to resubmit the transaction again. Of course, as clients retry their transaction the problem may increase, such that the system quickly becomes unusable. Some systems have tried to address this issue, including, for example, the high contention stock trading database system discussed in P. Peinl and A. Reuter, "High contention in a stock trading database: A case study", In Proceedings of ACM-SIGMOD 1988 International Conference on Management of Data, Chicago, pages 260-268, June 1988.

However, one of the problems with traditional methods used to minimize or eliminate hot spots, is that they are typically very platform dependent or work at a level within the database that makes them less flexible for use with everyday applications. For example, the high contention stock database described in the Peinl reference cited above is restricted to use in stock trading systems. Several of the techniques disclosed therein can be extended for use with other on-line transaction processing systems, however the method is difficult to extend to other application server environments. Database manufacturers use internal and often proprietary methods to optimize data access and updates within their database systems themselves, while the application developer typically has little or no means to customize the operation of the database's specific features. Thus, a large degree of control is removed from the application developer and/or the application administrator, when these are the particular people that are best suited to knowing and understanding potential hot spots within their database application and are in the best position to make the most use of available features. As such, any system or method that allows application developers and/or administrators, to easily change the operation of their application, at a layer higher than that of the proprietary database level, to reflect their understanding of the operation of the software, and to minimize potential hot spots, would be of tremendous benefit. The application developer should be able to make use of these features with little or no knowledge of the underlying database structure. The understanding garnished through trial and error, or planning, during the software development process, can be used to support an understanding of the database structure that can be then used with other databases in the future.

SUMMARY OF THE INVENTION

An embodiment of the invention addresses the need for a system by which a software developer or administrator can use their knowledge and/or development of a particular application, to best utilize database features in a way that minimizes hot spots, and optimize the performance of data access and updates to the database. In order to do this, an embodiment of the invention makes use of the developers knowledge of particular transaction and transaction operations that can be performed in a commutative manner. As defined in the context of one embodiment of the invention, an operation is considered a commutative operation if it can be combined with another commutative operation, such that the final result of performing the two operations at the same time would be equivalent to, or equal to, the final result if the two operations were performed sequentially. The overall effect is to perform the operations in a parallel or simultaneous fashion so that one operation does not block or restrict the processing of a second operation. The result is an increase in database access speed and performance, without any resulting decrease in database reliability. Unlike traditional methods, systems developed in accordance with an embodiment of the invention allow a first commutative operation and a second commutative operation to be performed substantially at the same time, on the same block of data, in the same data access operation, reducing and/or eliminating the chances of delayed or failed data accesses.

In addition to allowing the processing of commutative operations, an embodiment of the invention ensures that the resulting combination or commutative operation will be successful, or at least within the expectations of the software developer. For example, in traditional systems a first operation and a second operation may be performed sequentially, with the software developer knowing confidently that the second operation will fail if the end result of the first operation is unsuccessful i.e., there is a built-in checking of the transaction processing using traditional methods. When operations are combined in a commutative manner, such as they are in an embodiment of the present invention, this inherent checking of the operation's result is not present. An embodiment of the invention tackles this potential problem in a number of ways. In one embodiment, the invention employs a set of boundary conditions, which can be specified by a software developer or administrator, that restrict the operation of the commutative operation in accordance with the present state of the data within the database. Generally speaking, a commutative operation will be performed only when the result of that commutative operation is within a set of boundary conditions specified by the developer or administrator. If the operation falls outside the boundary conditions, a number of options may be taken, including delaying the transaction or processing it in a standard fashion.

An embodiment of the invention also allows for the specification of commutative operations and boundary conditions in a manner that is easy to use and customize according to particular database specifications. In one embodiment, the client application, developed by the software developer, reads in or retrieves a set of commutative operation configuration information and/or boundary conditions, at the run time phase. Since these configuration files can be modified very quickly and easily by a software developer or administrator, an embodiment of the invention provides a quick and easy means by which a developer or administrator can fine tune the operation of the system to best tackle potential database hot spots. In the environment of a Java application, in which the client may be, for example, a servlet or an EJB application, this configuration file may be part of, or include, the deployment descriptor information commonly used to define the EJB run time operation. When the EJB is deployed, the deployment descriptor is parsed to find information about commutative operations understood by EJB applications, and or boundary conditions that the commutative operations must adhere to. When a client application tries to use the EJB to modify its database, the software developer may specify that certain commutative verbs, are used to access or update the data. As deployed in Java environments, an embodiment of the invention is particularly easy to configure and deploy, and allows the integration of a wide variety of database systems, since it removes the dependency of the particular database from the equation. The control of hot spot optimization is placed at the EJB level, where it can be readily configured by the software developer or administrator, and removes the dependency upon proprietary database specific optimizations.

DETAILED DESCRIPTION

Figure 1:
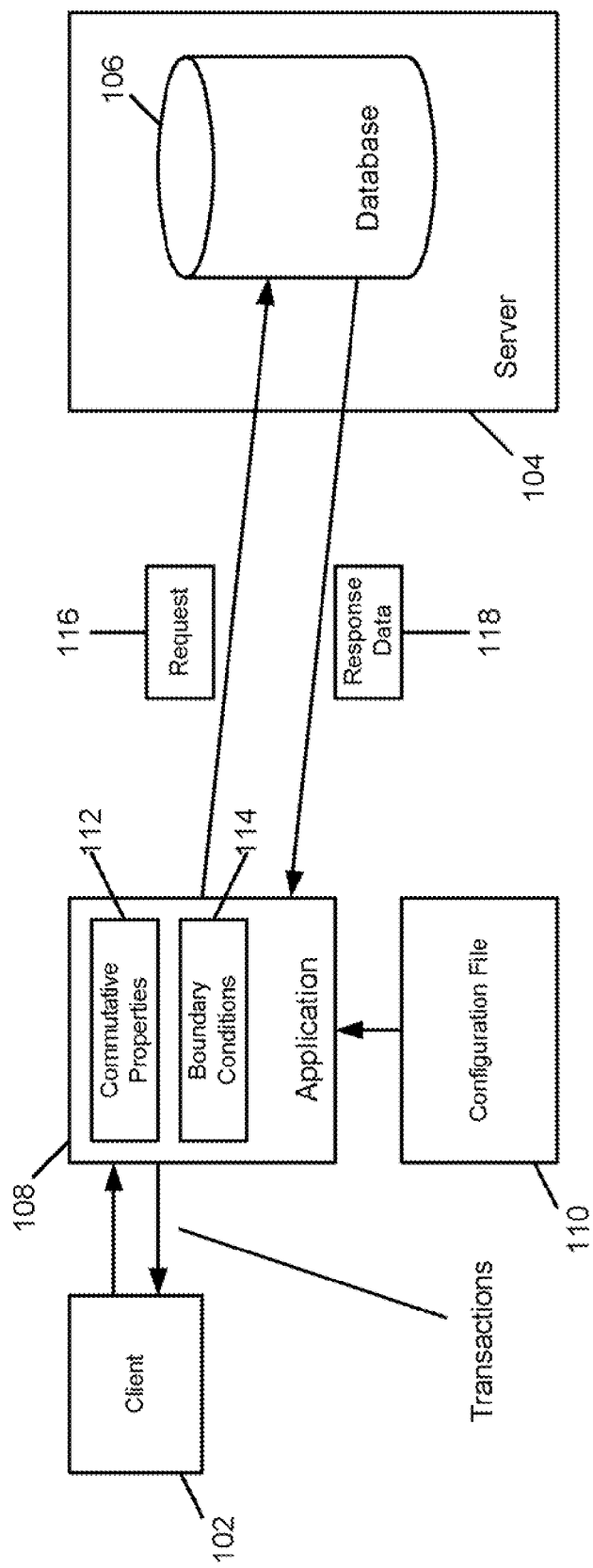
FIG. 1 shows a schematic of a system in accordance with an embodiment of the invention.

An embodiment of the invention addresses the need for a system by which a software developer or administrator can use their knowledge and/or development of a particular application, to best utilize database features in a way that minimizes hot spots, and optimize the performance of data access and updates to the database. In order to do this, an embodiment of the invention makes use of the developers knowledge of particular transaction and transaction operations that can be performed in a commutative manner. As defined in the context of one embodiment of the invention, an operation is commutative if it can be combined with another commutative operation, such that the final result of performing the two operations at the same time would be equivalent to, or equal to, the final result if the two operations were performed sequentially. The overall effect is to perform the operations in a parallel fashion so that one operation does not block or restrict the processing of a second operation. The result is an increase in database access or performance, without any resulting decrease in database reliability. Unlike traditional methods, systems developed in accordance with an embodiment of the invention allow a first operation and a second commutative operation to be performed substantially at the same time, on the same block of data, reducing and/or eliminating the chances of delayed or failed data accesses.

In addition to allowing the processing of commutative operations, the invention in some embodiments ensures that the resulting combination or commutative operation will be successful, or at least within the expectations of the software developer. For example, in traditional systems a first operation and a second operation may be performed sequentially, with the software developer knowing confidently that the second operation will fail if the end result of the first operation is unsuccessful i.e., there is a built-in checking of the transaction processing using traditional methods. When operations are combined in a commutative manner such as in an embodiment of the present invention, this inherent checking of the operation's result is not present. The invention tackles this in a number of ways. In one embodiment, the invention employs a set of boundary conditions, which can be specified by a software developer or administrator, that restrict the operation of the commutative operation in accordance with the present state of the data within the database. Generally speaking, a commutative operation will be performed only when the result of that commutative operation is within a set of boundary conditions specified by the developer or administrator. If the operation falls outside the boundary conditions, a number of options may be taken, including delaying the transaction or processing it in a standard fashion.

An embodiment of the invention also allows for the specification of commutative operations and boundary conditions in a manner that is easy to use and customize according to particular database specifications. In one embodiment, the client application, developed by the software developer, reads in or retrieves a set of commutative operation configuration information and/or boundary conditions, at the run time phase. Since these configuration files can be modified very quickly and easily by a software developer or administrator, an embodiment of the invention provides a quick and easy means by which a developer or administrator can fine tune the operation of the system to best tackle potential database hot spots. In the environment of a Java application, in which the client may be, for example, a servlet or an EJB application, this configuration file may be part of, or include, the deployment descriptor information commonly used to define the EJB run time operation. When the EJB is deployed, the deployment descriptor is parsed to find information about commutative operations understood by EJB applications, and or boundary conditions that the commutative operations must adhere to. When a client application tries to use the EJB to modify its database, the software developer may specify that certain commutative verbs, are used to access or update the data. As deployed in Java environments, an embodiment of the invention is particularly easy to configure and deploy, and allows the integration of a wide variety of database systems, since it removes the dependency of the particular database from the equation. The control of hot spot optimization is placed at the EJB level, where it can be readily configured by the software developer or administrator, and removes the dependency upon proprietary database specific optimizations.

FIG. 1 shows a schematic of a system in accordance with an embodiment of the invention. As shown in FIG. 1, a client or client application 102 communicates with a database 106 at a remote server 104. The client typically interacts with the database via an application 108. In this embodiment, a client passes transaction to the application 108 which in turn issues requests 116 to the database 106. In response to these requests the database 106 may be updated, or may return some form of response or data 118. It will evident to one skilled in the art that the application 108 may reside on the client machine 102, or on the remote server 104, and may be accessed by any variety of any communication protocols, including but not limited to the Internet or the Web. In a typical e-commerce environment, for example, the client 102 is a software application residing on a user desktop. The application 108 is a remote application residing on or in communication with a web server. The user operating the client 102 also operates the application 108, which in turn retrieves any necessary data from the database 106. Such applications may include financial applications, or e-commerce applications including, for example, on-line purchasing, flight reservation, banking and/or information retrieval systems. As shown in FIG. 1, the application includes the logic required to understand the commutative properties of various transactions, and operations associated with those transactions. The application also includes the logic required to apply boundary conditions 114 to these operations.

When the application is first executed or configured, typically at run time, it reads information from a configuration file 110 to set defaults, commutative properties 112, and boundary conditions 114. These commutative properties and boundary conditions are then used to control or modify the transaction operations from the client 102, and to prepare the request 116 which is then transmitted to the database 106.

Figure 2:
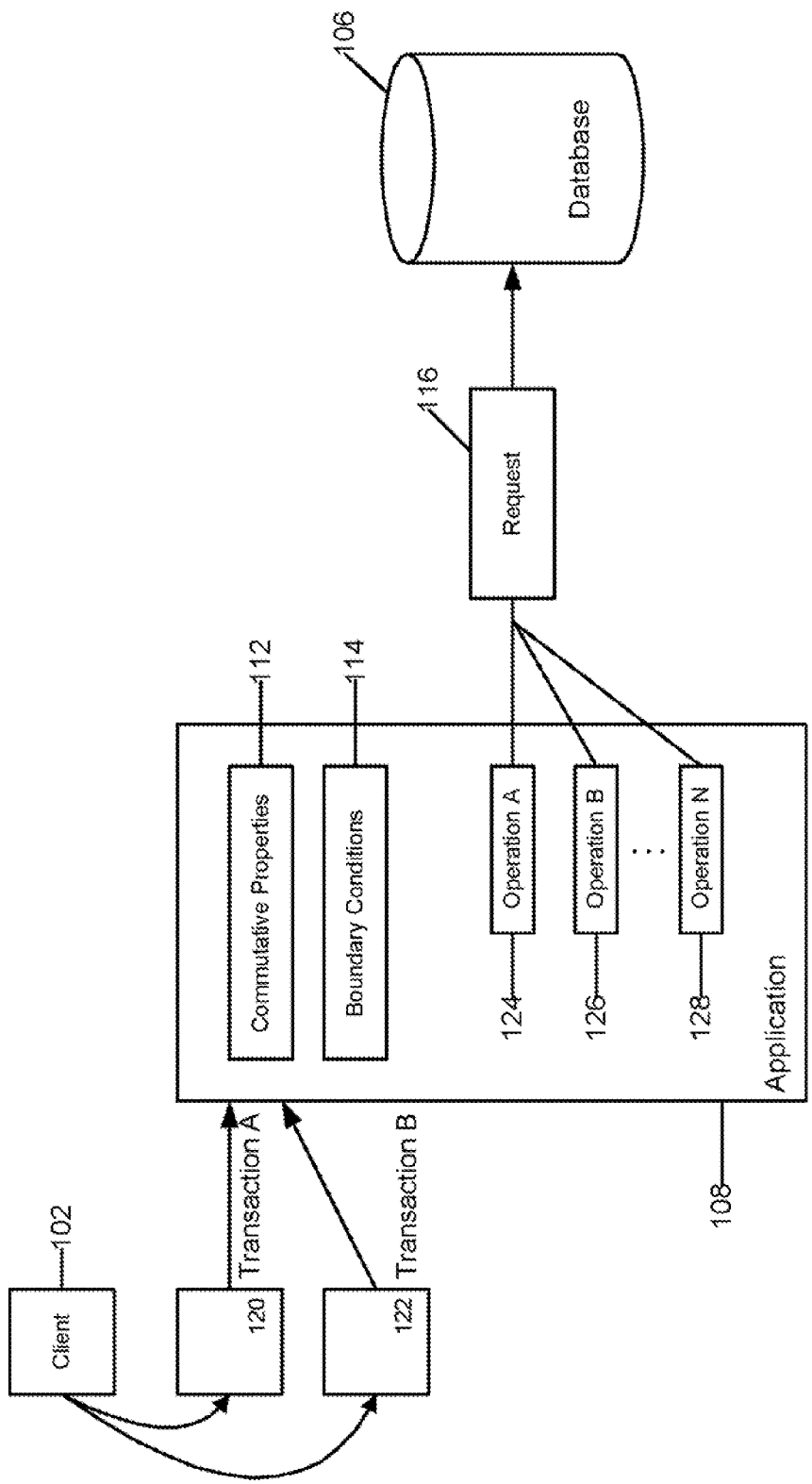
FIG. 2 illustrates in more detail the operation of an application as it is used to transmit a transaction request 116 to a database 106.

FIG. 2 illustrates in more detail the operation of an application as it is used to transmit a transaction request 116 to a database 106. As shown in FIG. 2, the client 102, or a plurality of clients (not shown here for ease of illustration), generates a number of transactions including a first transaction A 120, and a second transaction B 122. Each of these transactions A and B may be designed to update or modify the same data portion of the database 106. In accordance with an embodiment of the invention, the application 108 is preconfigured with a set of commutative properties 112, and boundary conditions 114. The software developer or administrator may specify that certain operations including operation A 124 and Operation B 126, are commutative operations, and that they should be handled in a commutative manner, i.e. at the same time, instead of sequentially. When an application understands commutative operations such as this, a request 116 may be formed that performs both operations in combination, at the same time.

Figure 3:
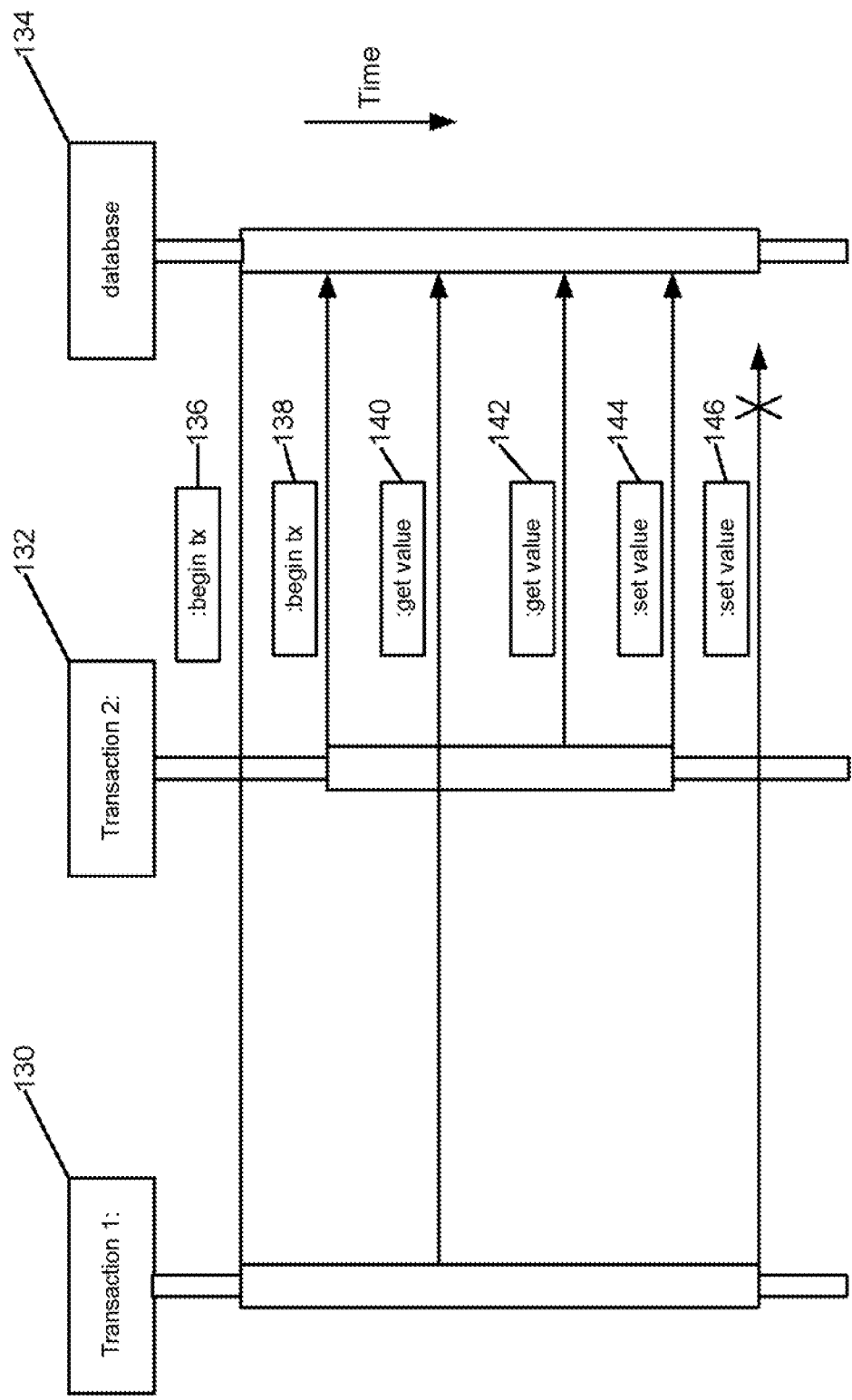
FIG. 3 illustrates a lifecycle diagram of a plurality of operations that are not commutative, or are handled in a non-commutative manner.

FIG. 3 illustrates a lifecycle diagram showing how a plurality of operations that are not commutative are handled in a non-commutative manner. This is the typical approach used in systems in existence today. As shown in FIG. 3, a first transaction 1, 130, and a second transaction 2, 132, perform operations on a database 134. In the example illustrated, at a first point in time transaction 1 initiates a: begin transaction 136. At a later point in time transaction 2 also initiates a: begin transaction operation 138. Both operations will be in the form of function calls to the database 134. Once initialized, the transactions will normally operate as usual. For example in the example shown in FIG. 3, transaction 1 then proceeds to request a: get value instruction 140 and a: set value instruction 146. However, while transaction 1 is attempting to set the value it has previously retrieved in the: get value step, transaction 2 also tries to issue a: get value call 142 and a: set value 144. As can be seen in FIG. 3, the attempt by transaction 1 to set value 146 fails because the value has changed between the time it was retrieved in step 140, and the time it is attempted to be updated in call 146. The operation of transaction 2 in getting a setting values interferes with the operation of transaction 1, such that transaction 1 will freeze and will typically have to be re-attempted.

Figure 4:
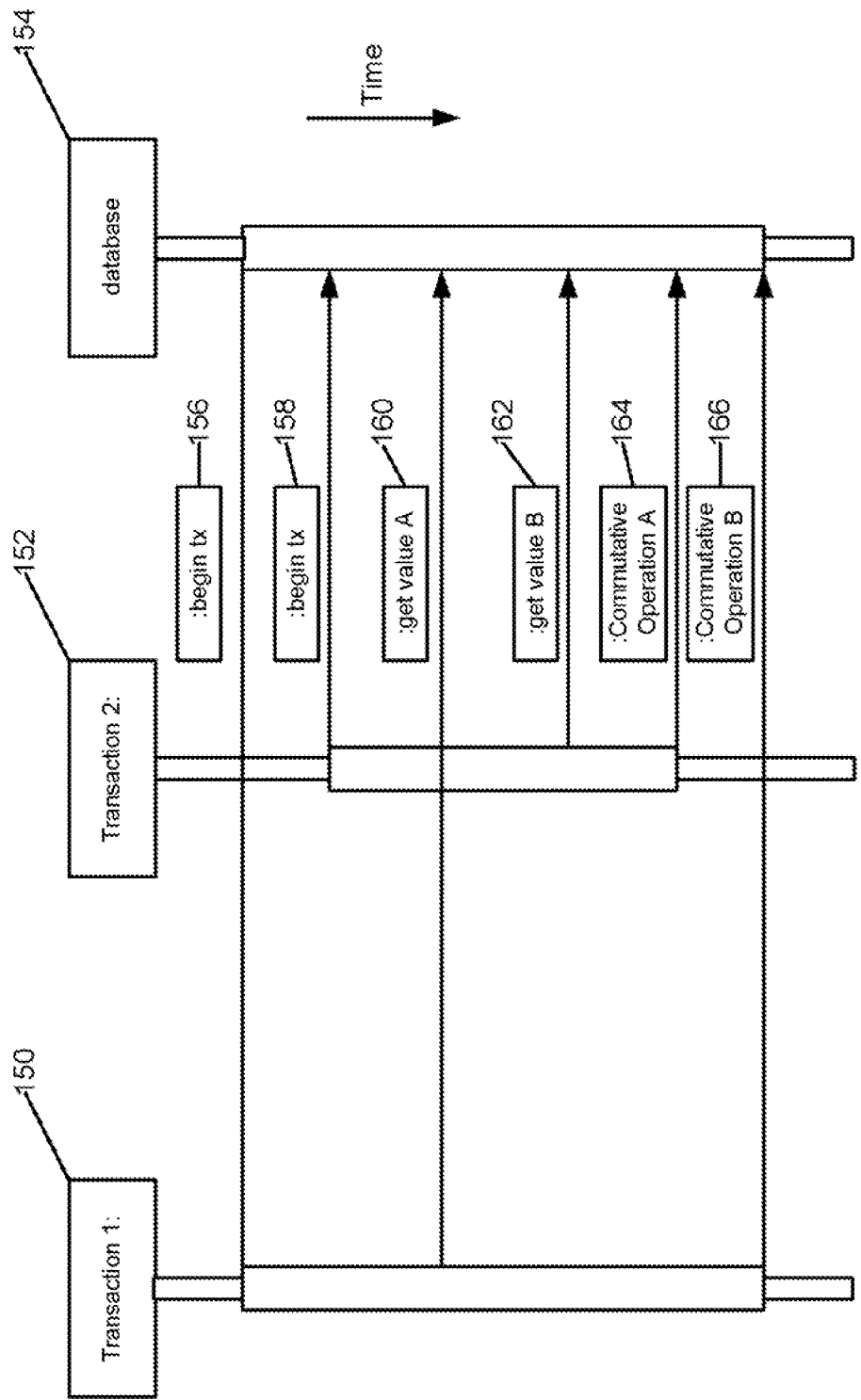
FIG. 4 illustrates a similar lifecycle diagram in which an embodiment of the invention is used to allow commutative operations to take place successfully on the same portion of data.

FIG. 4 illustrates a similar lifecycle diagram, in which however an embodiment of the invention is used to allow commutative operations to take place successfully on the same portion of data. As can be seen in FIG. 4, a transaction 1, 150, and a transaction 2, 152, again access a database 154. As with the previous example transaction 1 issues a: begin transaction call 156 to the database. At a subsequent point in time, transaction 2 also issues a: begin transaction call 158 to the database to update or access data. In the example in FIG. 4, transaction 1 issues a: get value request 160, followed by a subsequent commutative operation 166. While this: get value and operation steps are being performed, transaction 2 also issues a: get value request and its own commutative operation 164. Since the system is aware of commutative operations A and B, (164 and 166 respectively), it can allow the operations to proceed simultaneously, such that commutative operation 166, instead of being held or rolled back, is allowed to proceed in combination with its predecessor. This operation succeeds only as long as the new value database is within the boundary conditions previously set by the system and/or the system administrator.

Figure 5:
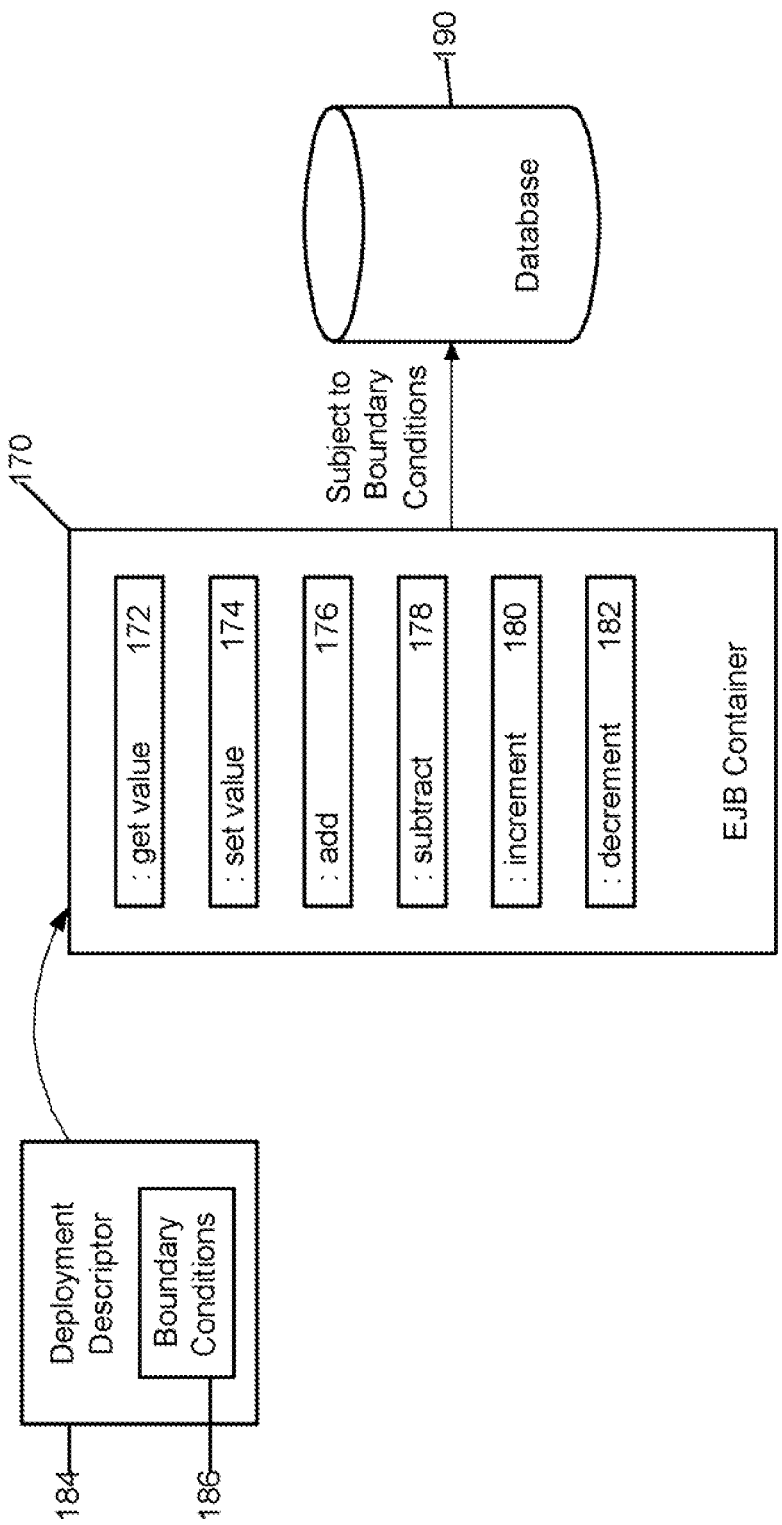
FIG. 5 illustrates one embodiment of the invention in which EJB is used as the application by which clients access data on the database.

FIG. 5 illustrates one embodiment of the invention in which an Enterprise Java Bean (EJB) is used as the application by which clients access data on the database. As shown in FIG. 5, the EJB container includes a set of verbs which an application developer may use to access data on the database. The examples shown in FIG. 5 are merely illustrative, and it will be evident to one skilled in the art that additional verbs can be used that allow the commutative operations of in one embodiment of the invention to be performed. As shown in FIG. 5, the EJB container is defined during the deployment phase by a deployment descriptor. In addition to defining the verbs that will be available to the EJB, the deployment descriptor also includes a set of boundary conditions 186 that effect the operation of the verbs. The EJB container will typically include non-commutative operations such as: set value, which are well known to one skilled in the art. However, in addition to these standard non-commutative operations, the EJB container upon deployment also includes commutative verbs such as, for example, increment and: decrement. When an application developer uses one of these commutative verbs to access or update information on the database, the system is aware that the verbs can be used commutatively. So, for example, two: increment steps can be added together to create a single commutative: increment operation, which is then applied to the database 190.

In the EJB embodiment, the verbs and boundary conditions are usually used to generate an EJB language command, which is then transferred to the database for operation according to its proprietary needs. For example the operation and boundary condition my be expressed using a standard database query language statement such as update data <x> where <y>. Where x is the operation and y is the boundary condition. Commutative operations will not always take place since they are predicated upon the constraint set by the boundary conditions being met. So, for example, if the boundary conditions specify that a particular data value on the database be always greater than or equal to zero, and if a set of commutative operation is attempted which will violate the boundary condition i.e., the resultant value of the commuted operations would be less than zero, then the database will not perform the commutative operation, the operation will not be allowed, and the transaction will be aborted. When the boundary conditions are met, the operation will proceed and the data will be committed to the database when the transaction ends. It will be evident that providing a mechanism in this manner to specify commutative operations and boundary conditions at the EJB container level allows the application developer great latitude in defining how their system should handle potential hot spots, without requiring the developer to specify routines in database specific formats. An embodiment of the invention also allows the underlying database technology to be separated from the application level technology, which eliminates the dependence on platform specific databases, and allows additional types of databases to be integrated quickly and easily.

Figure 6:
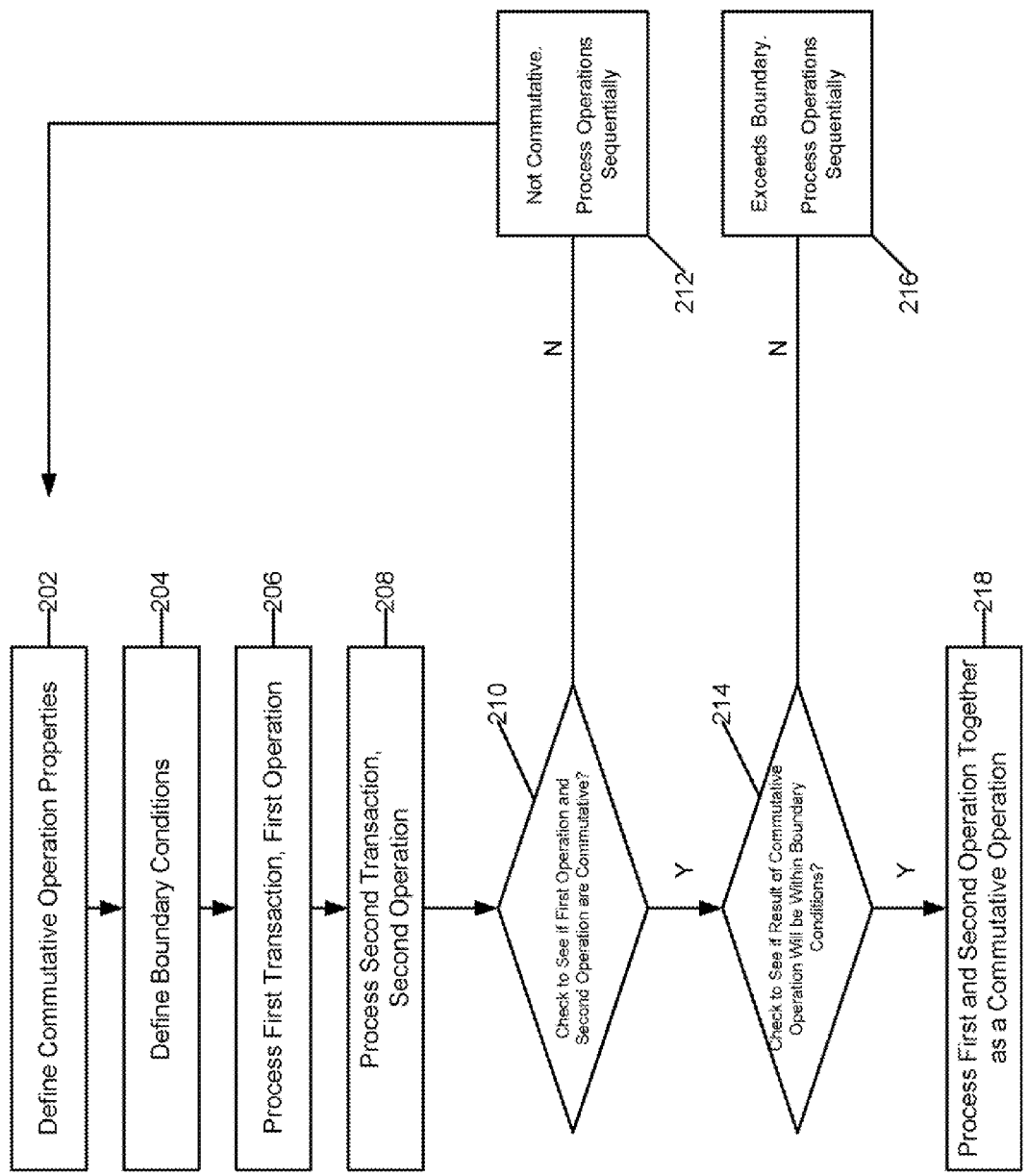
FIG. 6 illustrates a flow chart of a commutative operation process in accordance with an embodiment of the invention.

FIG. 6 illustrates a flow chart of a commutative operation process in accordance with an embodiment of the invention. As shown in FIG. 6, in step 202, a set of commutative operations are defined. For example, an administrator or application developer may specify that certain verbs such as increment data and decrement data should be handled commutatively, either in the database as a whole, or for a particular portion of data within that database. In step 204, a set of boundary conditions or predicates are defined, which will effect the operation of the commutative operations. For example, boundary conditions may specify that a particular range of data within the database remains within a set range for example between 0 and 100. If the data created as a result of a commutative operation would be outside of these boundary conditions, then the operation is not allowed to proceed.

In step 206, a first transaction is received at the system and is processed for operation against the database. In step 208, a second transaction is also received and processed for operation. Based on its knowledge of which verbs should be set to be commutative, and what the results of the boundary conditions should be, the system first checks, in step 210, to see if the first operation and the second operation are commutative, and should be handled in a commutative manner. If not, then in step 212 the operations are performed as with traditional mechanisms. If however the operations are commutative, the system then checks in step 214 to see if the results of the commutative operation will be within the predefined boundary conditions. If the result would fall outside of the boundary conditions, then the operation is either halted or treated in a manner similar to traditional methods. However if the first and second operation are both commutative, and the result will be within the boundary conditions, then the system processes them together as a commutative operation 218.

It will be evident to one skilled in the art that there exists many methods by which to define commutative operation properties and boundary conditions, for example commutative verbs can be specified in a deployment descriptor for deployment within an EJB container in a Java environment, and boundary conditions can be defined in configuration files, such as within a config.xml configuration file.

Figure 7:
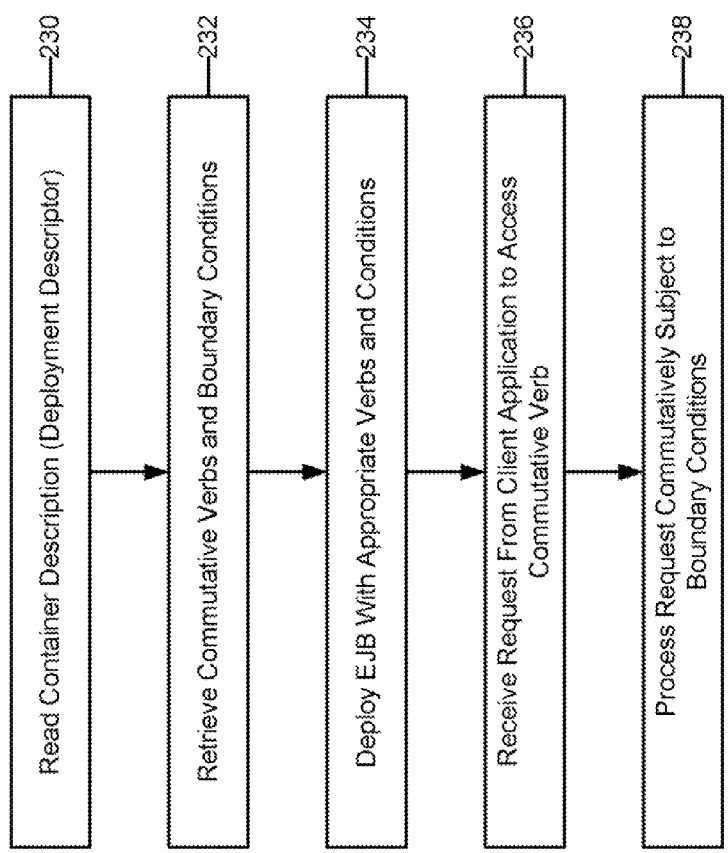
FIG. 7 illustrates a flowchart of how the server handles requests from a client in a typical EJB environment.

FIG. 7 illustrates a flowchart of how, in one embodiment, the server handles requests from an EJB client in a typical EJB environment. As shown in FIG. 7, in step 230, the server, upon deploying a EJB, reads the container description or deployment descriptor, and uses this information to configure the operation of the EJB. In step 232, the commutative verbs that will be applied to this EJB and any boundary conditions, are retrieved and are used to define the EJB's runtime operation. In step 234 the EJB is then deployed in a runtime environment with the appropriate verbs and boundary conditions. At any subsequent point in time, in step 236 the EJB container will receive a request from a client application to access data on a database using one or more of these commutative verbs. If it considers the verbs to be commutative, and the boundary conditions to be met, then the request or transaction is processed in step 238 in a commutative manner subject to the boundary conditions.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system, comprising:
    a server configured to receive transaction requests from clients to perform database operations to access or update data within a database;
    one or more configuration files, which includes
        information that specifies commutative properties, including specifying that certain of the database operations are allowed to be performed commutatively, and
        information that specifies boundary conditions, including specifying that the server should, when processing the transaction requests, constrain commutative execution of the database operations so that their combined effect on the database is within the boundary conditions, and
        wherein the one or more configuration files are used to configure an application at the server that enables access by the clients to access or update the data within the database; and
    wherein, upon receiving one or more transaction requests that include a plurality of database operations, the application at the server determines
        whether the plurality of database operations are allowed to be performed commutatively as specified by the commutative properties, and
        if the plurality of database operations are allowed to be performed commutatively then whether their combined effect on the database is within the boundary conditions,
        before processing the database operations commutatively within the database.

2. The system of claim 1, wherein the server will perform database operations commutatively if the operations are specified as being allowed to performed commutatively, and the combined effect of the operations on the database is within the boundary conditions.

3. The system of claim 1, wherein server will perform database operations consecutively if the operations are not specified as being allowed to be performed commutatively.

4. The system of claim 1, wherein server will perform database operations consecutively if the combined effect of the operations on the database is not within the boundary conditions.

5. The system of claim 1, wherein if database operations are specified as being allowed to be performed commutatively, but the combined effect of the operations on the database is not currently within the boundary conditions, the server delays performance of the operations until the combined effect of the operations on the database is within the boundary conditions.

6. The system of claim 1, wherein if database operations are specified as being allowed to be performed commutatively, but the combined effect of the operations on the database is not currently within the boundary conditions, the server performs the operations consecutively.

7. The system of claim 1, wherein at least one of an application developer and an administrator can specify the specific database operations that are allowed to be performed commutatively.

8. The system of claim 1, wherein at least one of an application developer and an administrator can specify the boundary conditions.

9. The system of claim 1, wherein at least one of an application developer and an administrator can specify:
    the specific database operations that are allowed to be performed commutatively; and
    the boundary conditions.

10. The system of claim 1, further comprising:
    a means for allowing at least one of an application developer and an administrator to specify the specific database operations that are allowed to be performed commutatively; and
    a means for allowing at least one of a software developer and an administrator to specify the boundary conditions.

11. A method, comprising:
    storing information at a server that specifies commutative properties, including specifying that certain of the database operations are allowed to be performed commutatively;

storing information at the server that specifies boundary conditions, including specifying that the server should, when processing transaction requests, constrain commutative execution of the database operations so that their combined effect on a database is within the boundary conditions;

using the commutative properties and the boundary conditions to configure an application at the server that enables access by clients to access or update the data within the database;

receiving at the application the transaction requests including database operations to access or update data within the database; and upon receiving one or more transaction requests that include a plurality of database operations, determining whether the plurality of database operations are allowed to be performed commutatively as specified by the commutative properties, and if the plurality of database operations are allowed to be performed commutatively then whether their combined effect on the database is within the boundary conditions, before processing the database operations commutatively within the database.

12. The method of claim 11, further comprising performing database operations consecutively if the operations are not specified as being allowed to be performed commutatively.

13. The method of claim 11, further comprising processing database operations consecutively if the combined effect of the operations on the database is not within the boundary conditions.

14. The method of claim 11, wherein if database operations are specified as being allowed to be performed commutatively, but the combined effect of the operations on the database is not currently within the boundary conditions, delaying the processing of the operations until the combined effect of the operations on the database is within the boundary conditions.

15. The method of claim 11, wherein if requested database operations are specified as being allowed to be performed commutatively, but the combined effect of the operations on the database is not currently within the boundary conditions, processing of the database operations consecutively.

16. The method of claim 11, further comprising:
allowing at least one of an application developer and an administrator to specify the specific database operations that are allowed to be performed commutatively.

17. The method of claim 11, further comprising:
allowing at least one of an application developer and an administrator to specify the boundary conditions.

18. The system of claim 11, further comprising:
allowing at least one of an application developer and an administrator to specify the specific database operations that are allowed to be performed commutatively; and allowing at least one of an application developer and an administrator to specify the boundary conditions.

19. A system, comprising:
a database that stores data;
a server that receives transaction requests to perform database operations to update the data within the database;
configuration information that specifies commutative properties, including specifying that certain of the database operations are allowed to be performed commutatively;
configuration information that specifies boundary conditions, including specifying that the server should, when processing the transaction requests, constrain commutative execution of the database operations so that their combined effect on the database is within the boundary conditions wherein the one or more configuration files are used to configure an application at the server that enables access by the clients to access or update the data within the database; and wherein, upon receiving one or more transaction requests that include a plurality of database operations, the application at the server determines
whether the plurality of database operations are allowed to be performed commutatively as specified by the commutative properties, and if the plurality of database operations are allowed to be performed commutatively then whether their combined effect on the database is within the boundary conditions, before processing the database operations commutatively within the database.

20. The system of claim 19, wherein the server is configured to:
perform database operations commutatively if the operations are specified as being allowed to performed commutatively, and the combined effect of the operations on the database is currently within the boundary conditions; and perform database operations consecutively if the operations are not specified as being allowed to be performed commutatively.

21. The system of claim 20, wherein if database operations are specified as being allowed to be performed commutatively, but the combined effect of the operations on the database is not currently within the boundary conditions, the server delays performance of the operations until the combined effect of the operations on the database is within the boundary conditions.

22. The system of claim 20, wherein if database operations are specified as being allowed to be performed commutatively, but the combined effect of the operations on the database is not currently within the boundary conditions, the server performs the operations consecutively.

* * * * *

UNITED STATES PATENT AND TRADEMARK OFFICE
CERTIFICATE OF CORRECTION

| | | |
|---|---|---|
| PATENT NO. | : 7,895,153 B2 | Page 1 of 1 |
| APPLICATION NO. | : 11/952834 | |
| DATED | : February 22, 2011 | |
| INVENTOR(S) | : Messinger | |

It is certified that error appears in the above-identified patent and that said Letters Patent is hereby corrected as shown below:

In column 4, line 49-50, delete "and or" and insert -- and/or --, therefor.

In column 6, line 22-23, delete "and or" and insert -- and/or --, therefor.

In column 7, line 15, delete "Operation" and insert -- operation --, therefor.

In column 8, line 16, delete "example, increment" and insert -- example,: increment --, therefor.

In column 8, line 27, delete "my be" and insert -- may be --, therefor.

In column 9, line 29, delete "a EJB," and insert -- an EJB, --, therefor.

Signed and Sealed this
Fourth Day of October, 2011

David J. Kappos
*Director of the United States Patent and Trademark Office*